Oct. 15, 1957 W. L. W. GIRVIN 2,809,779
ROTARY COMPRESSOR OR MOTOR
Filed Feb. 23, 1956 2 Sheets-Sheet 2

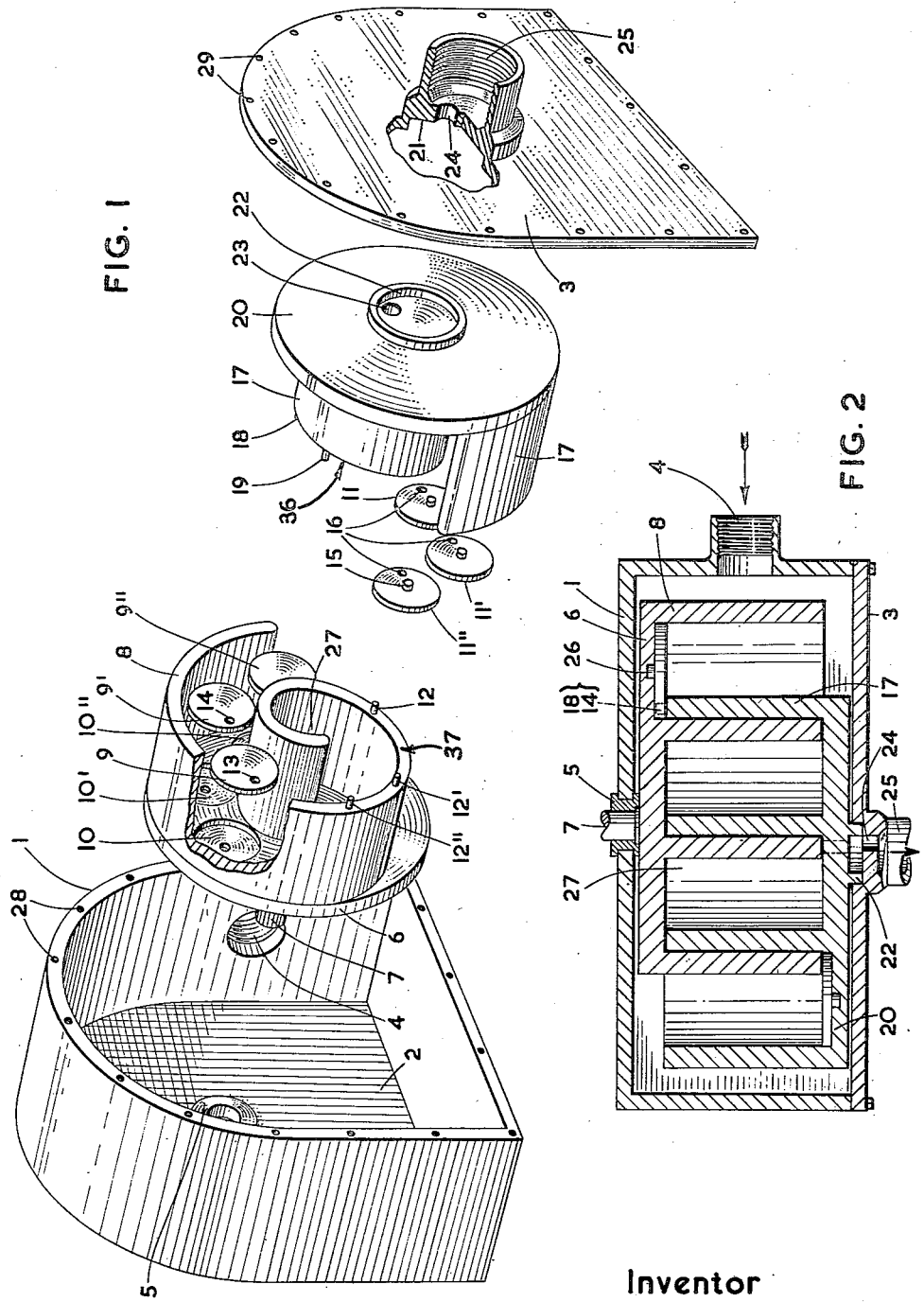

Inventor
WILLIAM L.W. GIRVIN
By Frederick E. Bromley
Att'y

United States Patent Office 2,809,779
Patented Oct. 15, 1957

2,809,779

ROTARY COMPRESSOR OR MOTOR

William L. W. Girvin, Toronto, Ontario, Canada

Application February 23, 1956, Serial No. 567,394

11 Claims. (Cl. 230—140)

This invention relates to compression engines of the type having two impellers which co-operate to form compression chambers or expansion chambers (as the purpose of utility may dictate), the impellers being eccentrically arranged on parallel axes about which they are made to rotate in the same direction and at the same nominal speed.

Prior art arrangements of this kind suffer from two major defects both of which have prevented any extensive use of them in appropriate fields of utility. One defect of the prior art concerns the sealing off of the cavities during the compression cycle. These devices have previously been comprised of Archimedean screws having more than two convolutions with a resulting large area of seal as compared to the volume of the contained fluid or gas. Another shortcoming of the prior art concepts resides in the means used to provide the cardiac or "breathing" action of the chamber walls during rotation of the assembly. At high operating speeds the prior art devices tend to flutter for the reason that the structure goes out of balance due to centrifugal forces distorting the impellers and causing them to deviate from synchronism; this rapidly destroys an already insufficient seal by scoring the end walls of the chambers.

All these arrangements each have a pair of similar complementary members which mutually oscillate when rotating about a common axis. It is difficult to envisage such a mechanism as being capable of operating in perfect dynamic balance. The pressure in the variable cavity applies gradient forces which revolve counter to the rotation of the assembly and so act as a brake upon the forces of dynamic unbalance which would otherwise wreck the mechanism as soon as speed reached the value of dynamic resonance. The pressure gradient may be regarded as a limiting device which prevents the mechanism from reaching infinite amplitude of self oscillation.

I have discovered that the stated drawbacks of prior art devices of the kind above referred to can be overcome by improvements in design of the impellers, and of the means for supporting and actuating them.

According to my invention each impeller comprises preferably less than two working turns of an Archimedean screw, the curvatures and radial increments of each point on the wall of one screw being complementary to that on its co-operating interleaved screw, less, of course, the necessary sliding clearances.

In a further aspect, each impeller is supported along its distal sealing edge in the end wall of its mating impeller by a plurality of eccentric bearings seated in the said end wall and free to rotate cyclically therein but eccentrically with respect to the screw impeller which it supports.

In a still further aspect, one impeller is rotated about its mean centre by a co-acting spindle free running in a journal positioned in one wall of an enclosing housing, while the other impeller is journalled in the juxtaposed wall of said housing in eccentric fashion, the eccentricity between the last said journal and the mean centre of the second impeller being selected to be substantially the same as the eccentricity of each of the said plurality of eccentric bearings which support the distal edges of each impeller.

The above arrangement has the following advantages:

Firstly, the screws interleave to provide a relatively large cavity with respect to the total length of seal contacts, so that the seal of the junctures of the endwalls and the screws displays a better sealing aspect ratio at all values for the pressure cavity.

Secondly, the cavity being confined by single turn interleaves, closes and seals its boundaries more quickly during each oscillation than do those having a greater number of screw turns.

Thirdly, the distal edges of the screws being supported individually along their length at a plurality of points within eccentric sealed bearings, the assembly is unable to establish screw-flutter even at quite high oscillation rates.

In a still further aspect, the plurality of bearings having their eccentricity synchronized with that of the one eccentric main bearing, the whole unit must rotate as a single mass, its parts being able to breath or oscillate with respect to the average centre of rotation only by the amount allowed by the eccentric bearings which, being distributed over the whole mass at preferably uniform intervals and all synchronized exactly by design, the machine cannot develop modes of oscillation other than its own fundamental, which is determined by the velocity of rotation about the mean axis of the impeller pair.

Philosophically, the plurality of eccentric bearings may be regarded as filters which prevent harmonic break-up of the structure's rigidity up to the speed whereat they themselves become fundamentals with respect to spindle velocity. By selecting the angle of increment of the screw-form, and selecting a correspondingly suitable plurality of eccentric bearing points, pumps or pressure engines can be designed to operate at almost any selected speed without fear of the mechanism becoming unstable at such speeds or at any speed therebelow.

The invention will now be more clearly disclosed by the following description of a selected construction in accordance therewith. The text will be aided and clarified by reference to the accompanying drawings.

The example selected comprises a gas compressor, but it should be understood that my teachings apply to compression engines generally. That is to say, the arrangement may be used as a pump or compressor to achieve work by translating gas or fluids, liquids and the like from a low pressure level to a high pressure level. Alternatively, the device will function as a work engine if the said high pressure level is connected to enter the ventricle of the cardiac chamber to expand it and so effect work by rotation of the main spindle, after the fashion of a motor.

As a gas compressor, the invention may be constructed according to what I presently regard as a preferred form as illustrated broadly by the attached drawings wherein:

Fig. 1 shows an exploded perspective view of a compressor according to the invention;

Fig. 2 shows the compressor in axial section;

Figure 3:
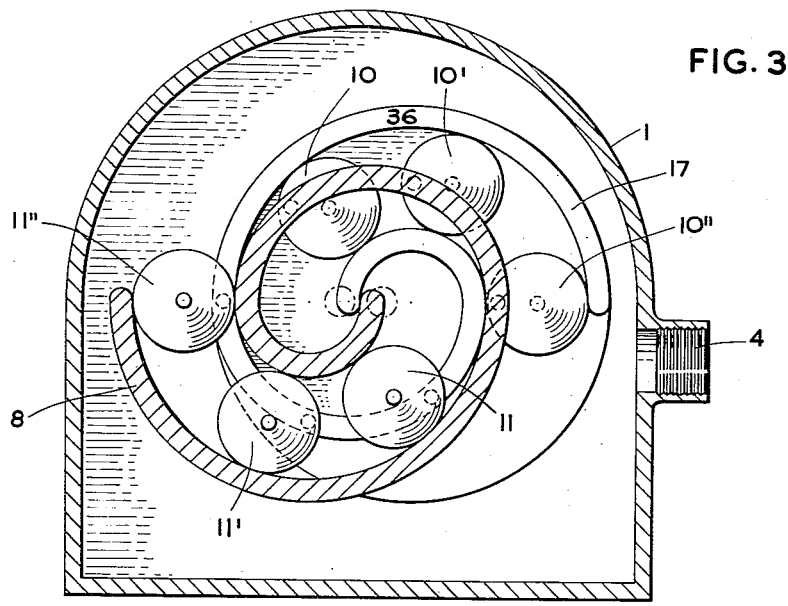
Fig. 3 is a transverse section of the compressor.
Figure 4:
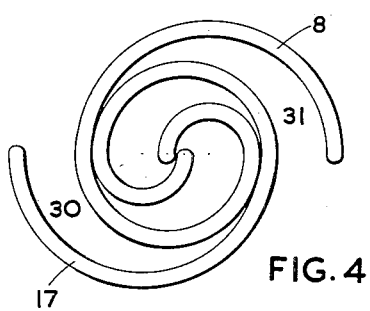
Figure 5:
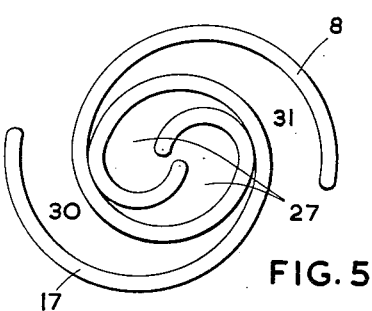
Figure 6:
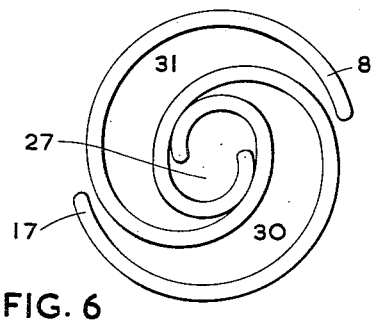
Figure 7:
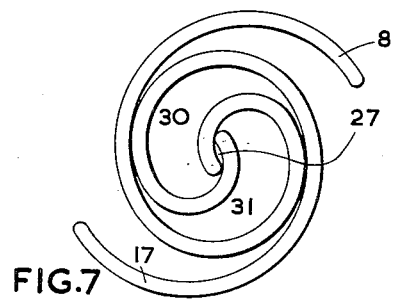

Figs. 4, 5, 6 and 7 comprise a diagrammatic analogue of successive attitudes of the fluid chambers during part of a revolution of the impeller assembly.

Referring to these figures, 1 is a housing which also acts as intake cylinder and low pressure chamber, connected to low pressure port 4 and including juxtaposed end walls 2 and 3. End wall 2 supports a main drive bearing journal 5 in which is rotatably supported a main drive spindle 7. End wall 3 supports an eccentric end bearing 22 formed upon impeller support and high pressure cavity end wall 20. Support 20 and end wall 3 also include high pressure ports 23 and 24 which co-act as a cycling valve synchronized to open when the cavity 27 (shown in various attitudes in Figs. 4, 5 and 6) reaches a condition somewhere between that shown in Figs. 6 and 7 (a specified minimum volume).

The spiral impellers 8 and 17 interleave and co-act with eccentric bearings 9, 9', 9" and 11, 11', 11" to hold the two spirals in a discrete relationship such as to provide a series of radial cells or cavities two of which are combined by rotation of the assembly to provide the alternately expanding and contracting cavity 27. Said eccentric bearings are crank devices and function to produce a crank action during rotation of the spiral impellers which they interconnect.

In the preferred construction depicted, the plurality of spiral impeller support bearings is 3 on each screw or 6 in all. These are preferably centred to revolve about respective axes disposed around an arc having its centre at the mean centre of rotation of the impeller in each case. The plurality of eccentric bearings are preferably disposed at 60 degree intervals along the said arc whose radius may be equal to the average value of the sum of all the radii of a spiral screw impeller.

The amount of offset between the centre of evolution of a screw and the centre of rotation of the assembly is determined by expediency to prevent jamming of the screw ends at the centre. This expediency is defined by the thickness of the screw walls which, in turn depends upon the ultimate pressure against them, and the strength of the material selected for the screw structure. The sealed bearings may be designed to have an eccentricity and diameter such as to provide one compression and one expansion phase per complete revolution of the assembly.

The eccentric bearings 9, 9', 9" are eccentrically attached by journals such as 13, 14 to bearing pins 18, 19 (and another not seen in Fig. 1) on the distal edge 36 of impeller 17 opposite the end support wall 6. These bearings are centred by their own axial bearing pins in recesses 10, 10', 10" in the end wall 6 of impeller 8, and by pins 26 one of which is shown in Fig. 2.

The other set of eccentric bearings 11, 11', 11" co-act in a similar manner with pins 12, 12', 12" positioned on the distal edge of impeller 8, which mate with respective journals 16, therein. Said distal edge is the edge face, designated 37, opposite the support wall 20. These eccentric bearings are also centrally recessed and journalled by pins 15 in co-acting positions (not shown in Fig. 1) within impeller end support wall 20.

Impeller 17 is supported eccentrically in housing end wall 3 by bearing ring 22 on impeller wall 20 co-acting with journal recess 21 in end wall 3. In the example illustrated the journal 21 is positioned in wall 3 so as to be eccentric by the selected amount, with the axis of bearing journal 5 in housing wall 2. The eccentricity could, of course, reside in the bearing 22, the housing bearings being co-axial, however, the relation shown is regarded as easier to tool-up, in practice, since the fastener-receiving holes 28 in housing 1 and the fastener receiver holes 29 in end wall 3 require to be indexed anyway, in order to ensure proper axial relationship between journals 5 and 21. Holes 28 are tapped to have threaded engagement with cap screws or other fasteners lodged in holes 29, as will be well understood in the art.

The high pressure end of the system vents through port 24 into the threaded fitting 25.

It will be clearly understood that impeller 8 is journalled in end wall 2 by the shaft 7 concentrically carried by end wall 6 and that impeller 8 is driven by a source of power connected to shaft 7. The interconnected impellers rotate as a unit.

It will now be readily seen that the assembly depicted and hereinbefore described provides a very rigidly co-ordinated cardiac pump whose cavity 27 changes through a complete low and high pressure cycle for each revolution of the assembly. The complete assembly becomes what may be described as a breathing impeller which scoops up gas or other fluid from the housing 1 supplied with low pressure material by way of port 4, sweeps it through channels 30, 31 where it is entrained in contracting cavity 27 which ejects it through port 23 into the work circuit.

The breathing action is rigorously controlled not merely by the eccentric relation of the two impeller elements, but particularly by the almost planetary action of the 6 impeller support bearings which hold the assembly in a steady state at all relative positions of the impellers as they breathe.

The construction according to my invention runs cleanly with very little vibration since all the forces of unbalance are now maintained strictly radial: all harmonies are restrained by the multiple support bearings so the system is forced to remain in perfect phase at all rational speeds. The cavity aspect ratio is highly favourable to successful mass production of the device with economically practical seal fits and tolerances. Inspection of Figs. 4 to 7 will make it evident that for purposes of pressurizing the gas or other fluid, only a small basic area requires to have a perfect or near-perfect seal. By making the pressurized regions of the screw less than two turns (in a one cycle pump) the effective area of seal is reduced to practical limits. It has been stated that the screw comprises "less than 2 turns." In practice it is desirable to treat two sections of the screw as somewhat separate in function, the inner portion adjacent the secondary eccentric bearings comprises really only one convolution the remainder of the screw being used largely to scoop up the material and funnel it into the central one-turn region. I do not wish to be limited in this regard. Actually the half turn shown for the scoop portion (enclosing area 30 or 31) is about optimum for good efficiency, but the scoop portion could be extended almost to several turns without changing the basic function and with only a possible loss in injection efficiency. The optimum scooping action seems to occur at about the limit shown in the accompanying figures which define a preferred but not limiting construction. The difficulty in approximating dynamic balance is also increased when the scoop portion of the screw is lengthened.

It will be evident that modifications of the invention are possible without departing from the broad spirit of my teachings. All such modifications are to be regarded as lying within the ambit of the appended claims.

What I claim is:

1. A compression device comprising a housing apertured to provide first and second ports therein for a fluid to be translated, a main drive bearing journal provided on said housing, a first spiral impeller within said housing and having an end support member, a main drive spindle rigidly supported upon said end support member axially along a mean axis of rotation of said spiral impeller and mounted in said main drive bearing journal to extend externally of said housing, a second spiral impeller adapted to reside in mesh with said first impeller and including an end support member, the two impellers co-acting to define a variable compression cavity, means for eccentrically journalling said second impeller in said housing, means for eccentrically journalling a distal edge of said first spiral impeller in the end support member of said second spiral impeller and means for eccentrically journalling a distal edge of said second spiral impeller in the end support member of said first spiral impeller, all the said eccentricities being selected to co-operate in terms of magnitude and phase so as to cause the two spiral impellers to oscillate to and fro with respect to one another when the said drive spindle is rotated.

2. A compression device as defined in claim 1 wherein the said second port is positioned in the housing within the area defined by said means for eccentrically journalling said second impeller in said housing, and in which said means includes a valve port open to said compression cavity and positioned to rotate with said impeller and to move into register with said second port, each time the angular attitude of said impeller defines a minimum volume in said compression cavity.

3. In a compression device comprising a housing provided with an inlet and an outlet port and containing first and second spiral impellers interleaved to define a compression cavity and adapted to oscillate about different centres when rotating to vary the volume of said cavity, a first radial wall member supporting said first spiral impeller and closing an end thereof, a second radial wall member supporting said second spiral impeller and closing an opposite end thereof, a drive spindle on said first wall member and journalled in said housing for rotating said first impeller about a mean axis, a bearing spindle on said second wall member and journalled in said housing, the axial attitudes of said drive spindle and said bearing spindle being characterised by a specified eccentricity calculated to permit the two impellers to relatively oscillate, a first plurality of auxiliary bearing members journalled in said first wall member and positioned along an arc about the mean centre of rotation of said first wall member and connected eccentrically at selected points to the distal edge of the second spiral impeller, and a second plurality of auxiliary bearing members journalled in said second wall member and positioned along an arc about the mean centre of rotation of said second wall member and connected eccentrically at selected points to the distal edge of the first spiral impeller, and a port supplied in one of said radial wall members for co-acting with said outlet port in the housing.

4. A construction in accordance with claim 3 wherein the said first and second pluralities of bearing members are equal in number and each is uniformly disposed along a respective arc at equal angular intervals with respect to the relevant centre of rotation of a wall member.

5. A construction according to claim 3 wherein each said auxiliary bearing member comprises a disc having axial means for rotatably supporting said disc upon a said wall member and bearing means disposed eccentrically of said axial means for co-acting with an edge of a said spiral impeller.

6. A compressor device comprising an enclosing housing having end walls and a side wall provided with an intake port, a first spiral impeller rotatably mounted in one of said end walls, a second spiral impeller rotatably mounted in the other of said end walls eccentrically with respect to the axis of said first spiral impeller, said spiral impellers being interleaved and having end walls disposed outwardly with regard to the interfitting relation of the spiral impellers, said end walls providing radial surfaces, a radial surface of one said end wall facing the radial surface of the other end wall, and the radial surfaces of said end walls having abutting contact with the respective corresponding edge portions of the spiral impellers, means operably interconnecting said spiral impellers at the distal edges of each impeller to the adjacent end wall of the other impeller to cause them to have relative oscillatory action during unidirectional rotation as a unit, means for rotating one of said spiral impellers, an outlet for compressed fluid in the vicinity of the axis of one of the spiral impellers and extending through the end wall thereof; and an outlet in the adjacent end wall of said housing.

7. A structure as set forth in claim 6, in which the means operably interconnecting the spiral impellers is in the form of a crank device having a crank-like action.

8. A structure as set forth in claim 6, in which means operably interconnecting the spiral impellers comprises an eccentric mechanism.

9. A structure as set forth in claim 6, in which the means operably interconnecting the spiral impellers comprises an eccentric device radially connecting the spirals of the spiral impellers and having a throw equal to the eccentricity of the axes of the spiral impellers.

10. A structure as set forth in claim 6, in which the means operably interconnecting the spiral impellers comprises eccentric bearings rotatably mounted in recesses provided in an end wall of one of the spiral impellers, and in which said eccentric bearings co-act with pins on the edge of the impellers and are journalled in holes in said eccentric bearings, the arrangement being characterised in that said holes and said eccentric bearings are eccentric with respect to each other.

11. A structure as set forth in claim 6, in which the fluid outlet in the end wall of the one spiral impeller is disposed eccentrically of the axis thereof and is arranged to coincide with the outlet in the said adjacent end wall of the housing at a given point during a turn of this spiral impeller.

References Cited in the file of this patent

UNITED STATES PATENTS

| | | |
|---|---|---|
| 801,182 | Creux | Oct. 3, 1905 |
| 1,041,721 | Ball | Oct. 22, 1912 |
| 1,700,038 | Feuerheerd | Jan. 22, 1929 |
| 2,112,890 | Gunn | Apr. 5, 1938 |
| 2,324,168 | Montelius | July 13, 1943 |
| 2,475,247 | Mikulasek | July 5, 1949 |

FOREIGN PATENTS

| | | |
|---|---|---|
| 62,895 | Norway | Sept. 30, 1940 |
| 367,086 | Great Britain | Feb. 18, 1932 |
| 980,737 | France | Jan. 3, 1951 |